Nov. 5, 1929.   W. V. RANDALL   1,734,691
CLOSURE FOR SHAFT BEARINGS
Filed Oct. 2, 1926
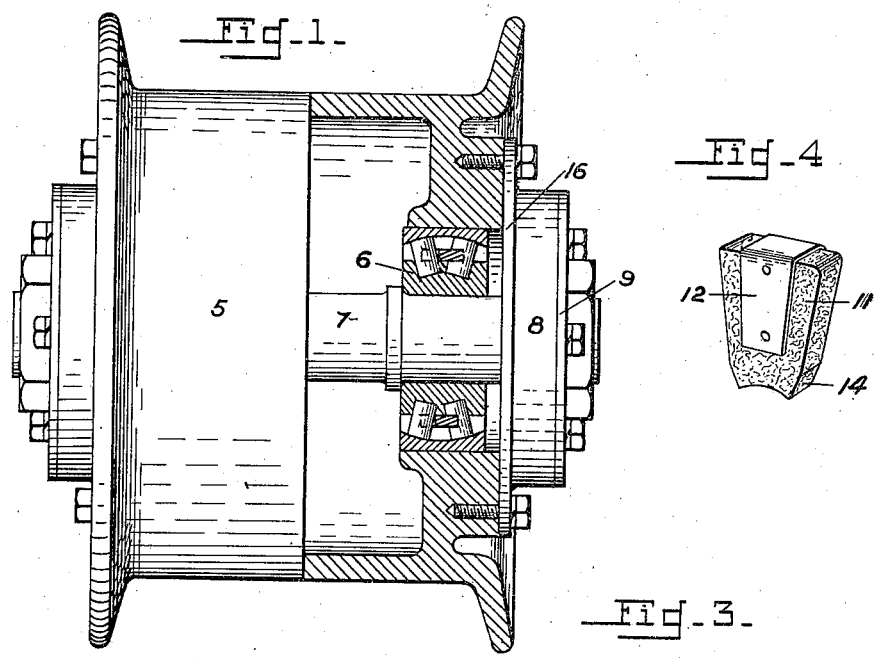
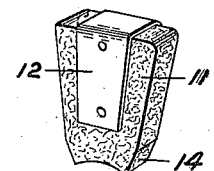
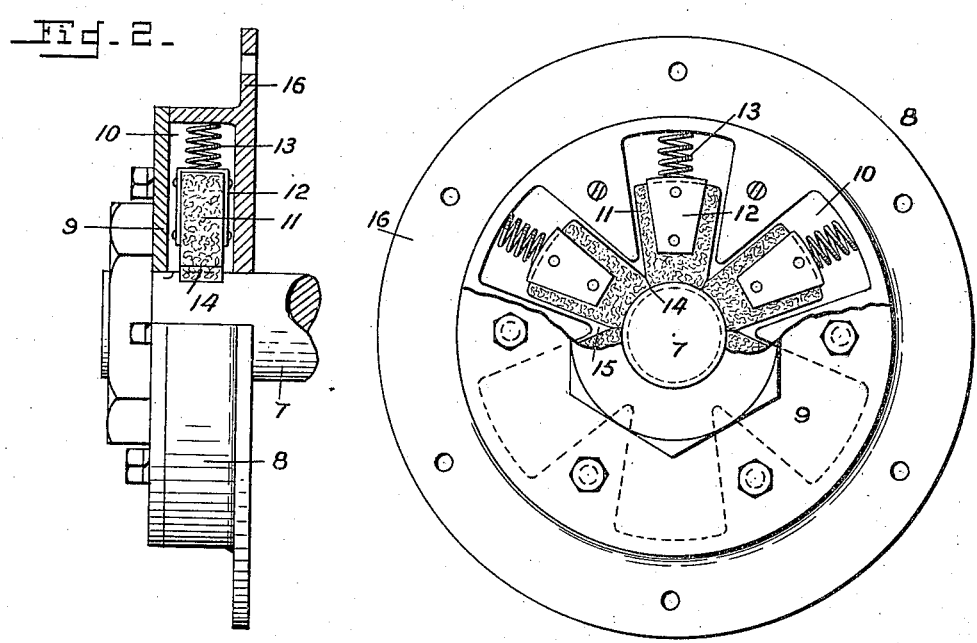
Inventor
W. V. Randall Patented Nov. 5, 1929

1,734,691

UNITED STATES PATENT OFFICE

WILLIAM V. RANDALL, UNITED STATES ARMY, OF NEWBURGH, NEW YORK

CLOSURE FOR SHAFT BEARINGS

Application filed October 2, 1926. Serial No. 139,224.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is a closure for shaft bearings of a type designed to prevent the escape of the lubricant and the entrance of foreign matter.

The principal object of the invention is to provide a self contained heavy duty closure which will function efficiently under such severe conditions in use as are encountered, for example, with track laying vehicles.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is shown in the accompanying drawing, wherein:

Fig. 1 is a longitudinal sectional view of a shaft bearing provided with the improved closure;

Fig. 2 is a side view of the unit partly in section;

Fig. 3 is a view in elevation, the cover being broken away to show details of construction; and Fig. 4 is a view in perspective of one of the absorbent blocks.

Referring to the drawings by numerals of reference:

The invention is illustrated as applied to the truck wheel of a track-laying vehicle, the wheel 5 being mounted on bearings 6 which in turn are mounted on the axle shaft 7. The wheel is hollow and forms a housing for containing lubricant for the bearing.

The closure for confining the lubricant and preventing the entry of foreign matter is a built-up annular unit as shown in Figs. 2 and 3, the casing consisting of a body 8 and a cover plate 9. The body is formed with a plurality of radially disposed blind channels or sockets 10 slightly tapered toward the center and in these channels are placed the members forming the packing ring. The members consist of absorbent blocks 11 of any suitable packing material such as felt and have secured thereto a metallic reinforcing plate 12 embracing the outer portion and serving as a seat against which a coil spring 13 at the head of the channel may act to hold the packing in contact with the shaft. The inner ends of the blocks are formed with tapered sides 14 which are in engagement with the adjoining blocks to establish an unbroken packing ring surrounding the shaft. The tapering of the sides establishes a slight clearance as indicated at 15 to facilitate the inward movement of the blocks as wear occurs. Before attaching the cover plate to inclose the blocks, the channel portions of the body are preferably packed with a light grease.

The body is formed with a flange 16 by means of which the closure unit may be bolted to the wheel.

It will be seen from the foregoing that the present closure constitutes a compact rugged unit completely encasing the segmental packing ring and adapted for external mounting on the shaft.

I claim:

A closure for shaft bearings including a body having a central aperture for mounting on a shaft and an annular flange for attachment to a wheel, said body formed with a plurality of radial channels tapered towards said aperture, an absorbent block disposed in each of the channels, the inner ends of the adjoining blocks provided with tapered sides and forming an unbroken packing ring, means for urging the blocks inwardly and a cover plate securable to the body to encase the blocks.

WILLIAM V. RANDALL.